United States Patent [19]

Schaeffer et al.

[11] E Re. 28,863

[45] Reissued June 15, 1976

[54] GUIDE ELEMENTS FOR MAGNETIC TAPES WOUND OR TO BE WOUND IN THE FORM OF PACKS ON FLANGELESS SPOOLS

[75] Inventors: Norbert Schaeffer, Ludwigshafen; Horst Fitterer, Heidelberg-Hasenleiser; Karl Uhl, Frankenthal; Georg Schnell, Ludwigshafen; Wilhelmus Andriessen, Wachenheim, all of Germany

[73] Assignee: Badische Anilin- & Soda-Fabrik Aktiengesellschaft, Ludwigshafen (Rhine), Germany

[22] Filed: Apr. 17, 1975

[21] Appl. No.: 569,315

Related U.S. Patent Documents

Reissue of:

[64] Patent No.: 3,841,582
Issued: Oct. 15, 1974
Appl. No.: 208,704
Filed: Dec. 16, 1971

[52] U.S. Cl. ..... 242/199; 242/76

[51] Int. Cl.[2] ..... G03B 1/04; G11B 15/32; G11B 23/04

[58] Field of Search ..... 242/197–200, 242/76, 71.2, 75.45, 187

[56] References Cited

UNITED STATES PATENTS

| | | | |
|---|---|---|---|
| 2,053,022 | 9/1936 | Corswandt et al. | 242/76 |
| 3,065,922 | 11/1962 | Ballauf | 242/199 |
| 3,092,346 | 9/1963 | Goodell et al. | 242/76 X |
| 3,111,281 | 11/1963 | Sinkewitsch | 242/200 |
| 3,672,604 | 6/1972 | Beaumont | 242/199 |

*Primary Examiner*—Leonard D. Christian
*Attorney, Agent, or Firm*—Johnston, Keil, Thompson & Shurtleff

[57] ABSTRACT

Guide elements for magnetic tapes wound or to be wound in the form of packs on flangeless spools, the guide elements being movable in the plane of rotation of the packs. At least part of the guide elements is located between the pack and the outermost winding and thus constantly guides the tape as it is wound or unwound, resulting in optimal tape guidance and consequently in a stable and accurate winding on the spool.

13 Claims, 12 Drawing Figures

Figure 1:
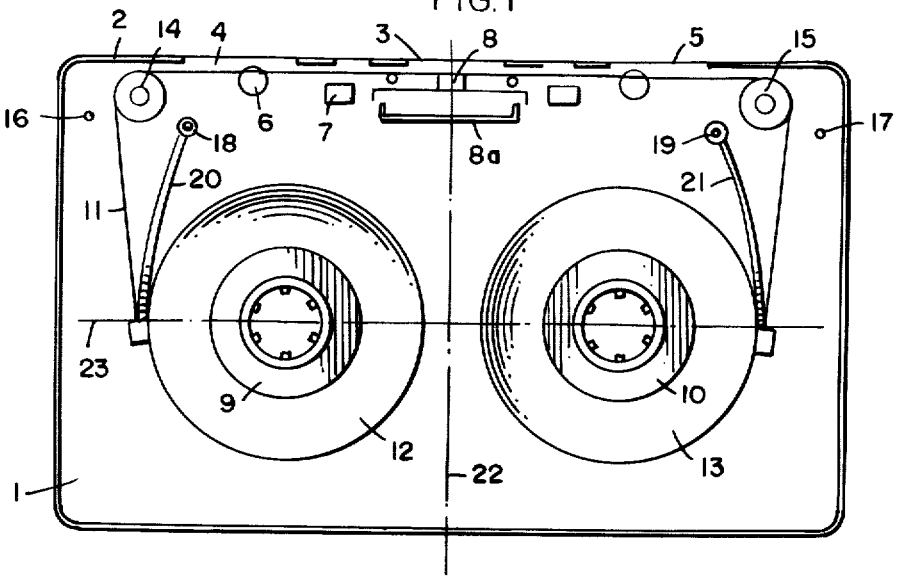

INVENTORS:
NORBERT SCHAEFFER
HORST FITTERER, ET AL

BY: Johnston, Root, O'Keeffe, Keil, Thompson & Shurtleff
ATT'YS

INVENTORS:
NORBERT SCHAEFFER
HORST FITTERER, ET AL
BY: Johnston, Root, O'Keeffe, Keil, Thompson & Shurtleff
ATT'YS INVENTORS:
NORBERT SCHAEFFER
HORST FITTERER, ET AL
BY: Johnston, Root, O'Keeffe, Keil, Thompson & Shurtleff
ATT'YS

GUIDE ELEMENTS FOR MAGNETIC TAPES WOUND OR TO BE WOUND IN THE FORM OF PACKS ON FLANGELESS SPOOLS

Matter enclosed in heavy brackets [ ] appears in the original patent but forms no part of this reissue specification; matter printed in italics indicates the additions made by reissue.

This invention relates to guide elements for magnetic tapes wound or to be wound in the form of packs on flangeless spools.

Magnetic tapes wound on flangeless spools are preferred for studio tape recorders and cassettes for a number of reasons. The total thickness of magnetic tapes has continually decreased in the course of their development, which has inevitably led to a reduction in the lateral rigidity of the tapes. As a result, problems of tape guidance occur to an increasing extent, particularly at high speeds. Whereas these difficulties have been substantially overcome in the case of studio tape recorders by means of, for example, tape tensioning means and other measures, they have not hitherto been satisfactorily overcome in the case of cassettes. When the recorder is operated, for example, in the case of rapid rewind, fast braking of the reels and sudden changes in the direction of tape motion, and during recording and reproduction, jamming of the tape may occur as a result of it slipping from the pack, a saucer-shaped or ridged pack may be produced, loops may form or the tape may even wrap itself round the capstan. These are frequent disturbances which result in damage to the magnetic tape and cassette and may render them useless.

A film cartridge is known which is provided with a pivotally mounted lever for guiding the film, the lever being arranged between the reels of film wound on flangeless spools and at the same time between one of the reels and the turn of film approaching said reel. The lever is provided with two pairs of flanges, the pair of flanges which extend inwardly in a substantially radial direction above and below the reel of film being longer than the pair of flanges extending outwardly across the turn of film. This guide lever is restricted to use in film cartridges which are seldom used and whose spools are driven at relatively low speeds. The use of such guide flanges which pass above and below the reel may be advantageous in the case of relatively thick film, but such flanges are totally unsuitable for thin magnetic tapes, e.g., those used in cassettes, because the magnetic layer may be damaged as a result of the windings of magnetic tape being bent over by the flanges or operation may be disturbed by the flanges jamming the tape windings.

For magnetic tape cassettes having only one reel of tape which must be withdrawn for recording or reproduction there is also known a guide member which is slidably mounted between the reel of tape and the turn of tape approaching or leaving said reel. This guide member is provided with two separate guide channels formed by flanges, one serving to guide the turn of tape leaving or approaching the reel of tape and the other cooperating with the reeled tape.

As mentioned above, these flanges may damage the magnetic tape. Moreover, particularly the vertical position of the magnetic tape is dependent on the position of the last few windings of reeled tape. In addition, friction between the reel of tape and the guide element is increased by these flanges.

German Utility Model No. 1,940,305 proposes a remedy which comprises sheets provided with beads and arranged above and below the pack and the magnetic tape, which sheets exert slight pressure on the edges of the tape to improve tape guidance. This arrangement has the disadvantage that not all mass-produced sheets have the same guiding properties, the buildup of static electricity on the tapes is increased and reel torque is influenced to a considerable extent with the result that the permissible tape tensioning forces cannot always be maintained. These last-mentioned disadvantages cannot however be overcome by using other conventional guide means, for example flanged idler rolls located inside the cassette housing.

The object of the invention is to provide means for optimally guiding magnetic tapes wound or to be wound in the form of packs on flangeless spools while avoiding the said disadvantages.

This object is achieved by a tape guide element which is movable in the plane of rotation of the pack, at least part of said tape guide element being located between the pack and the outermost winding.

These tape guide elements constantly guide the magnetic tape as it is wound or unwound, resulting in a stable and accurate winding on the reel and in undisturbed tape travel.

In one embodiment of the invention the tape guide elements are in the form of guided sliding members or pivotally mounted levers. Both designs achieve optimum guidance of the tape inside a cassette so that there is no friction between the tape and the cassette housing and, consequently, less torque is required to drive the reels, as well as on tape recorders employing flangeless spools.

In a further embodiment of the invention the tape guide elements are provided with guide flanges. Accurate vertical guidance of the tape is achieved with these guide flanges, i.e., troublesome friction between the pack and the housing is avoided.

Moreover, the use of the tape guide elements of the invention in cassettes enables the number of parts to be reduced, for example the idler rolls can be replaced by integral tape guide pins and there is no need for thin sheets of low friction film. In addition, the existing tape guide pins or shafts of the idler rolls can be used as pivots for the levers. The levers are either straight, bowed or slightly offset.

Figure 2:
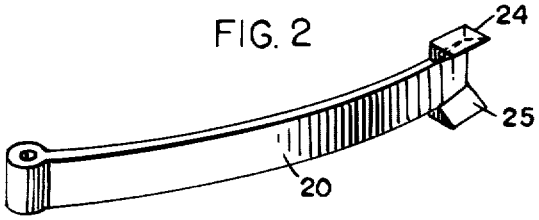
Figure 2A:
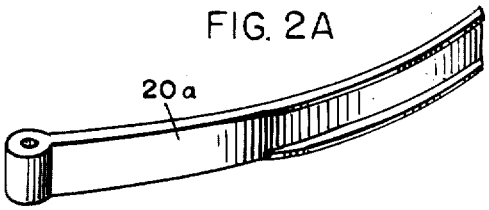
Figure 3:
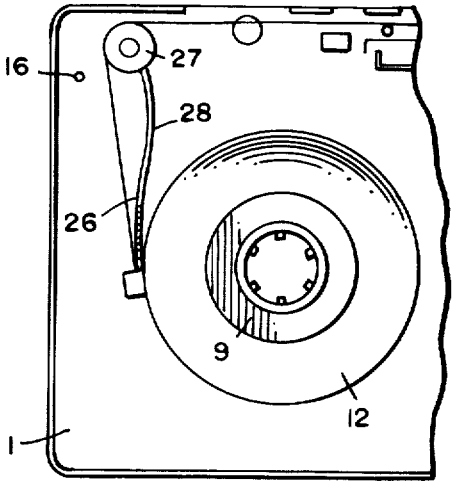
Figure 4:
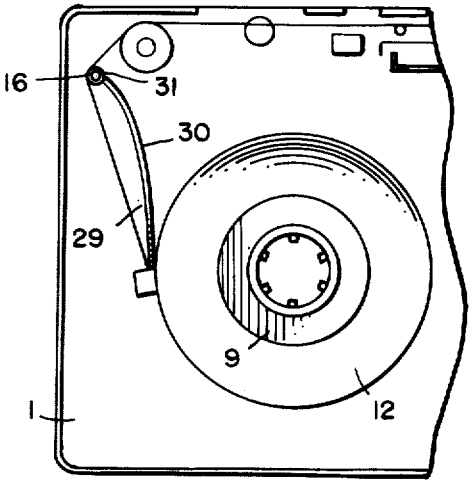
Figure 5A:
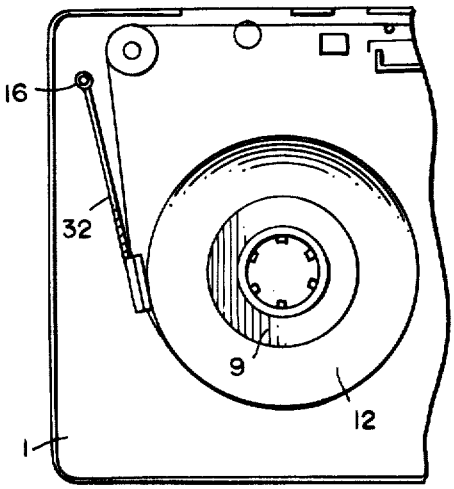
Figure 5B:
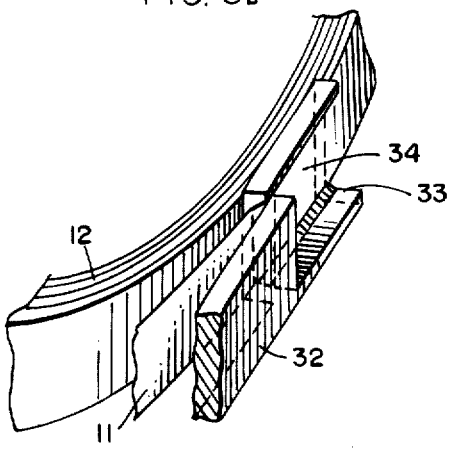
Figure 6:
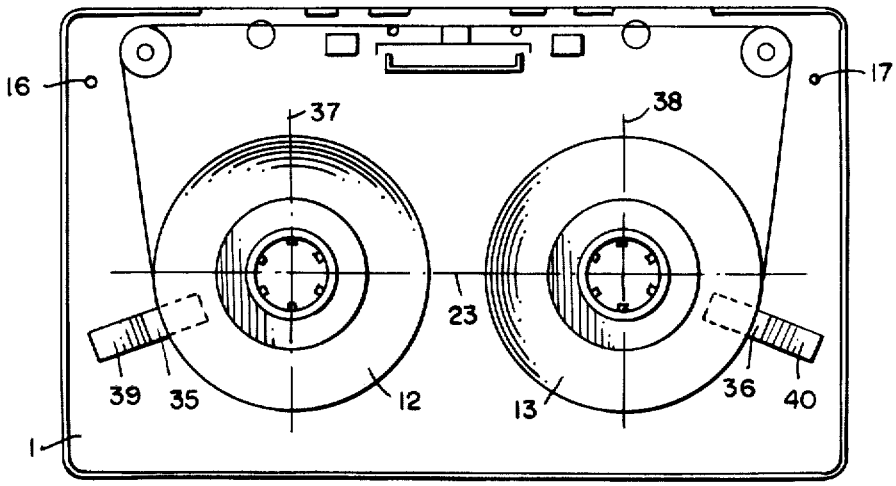
Figure 7:
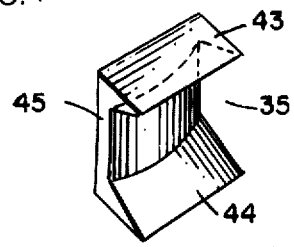
Figure 8:
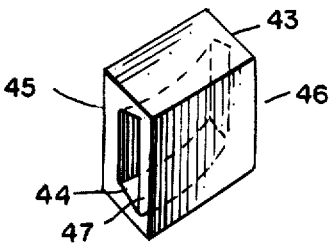

The invention is described in detail with reference to the accompanying drawings, in which FIG. 1 is a plan view of the base of a cassette with pivotable levers as tape guide elements, FIG. 2 is a perspective view of a lever shown in FIG. 1, FIG. 2A is a further perspective view of a lever shown in FIG. 1, FIG. 3 is a plan view of part of the base of a cassette with a lever pivotally mounted on the shaft of an idler roll, FIG. 4 is a plan view of part of the base of a cassette with a lever pivotally mounted on a guide pin, FIG. 5a is a plan view of part of the base of a cassette with a lever pivotally mounted on a pin, FIG. 5b is a perspective sectional view of part of the lever shown in FIG. 5a, FIG. 6 is a plan view of the base of a cassette having sliding members as tape guide elements, FIGS. 7 and 8 are perspective sectional views of two designs of the sliding member.

Figure 9:
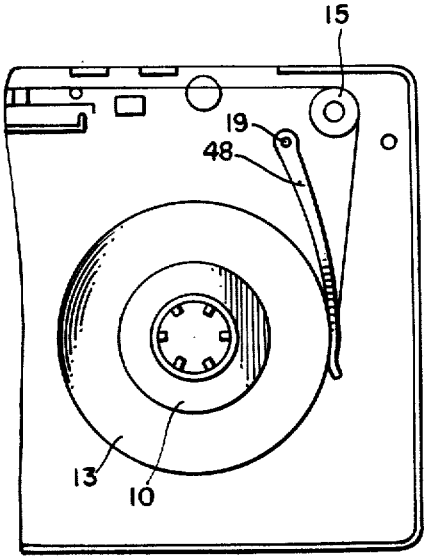
Figure 10:
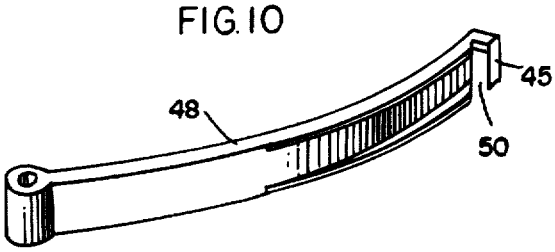

FIG. 9 is a plan view of part of the base of a cassette with another lever design, and FIG. 10 is a perspective view of the lever shown in FIG. 9.

A rectangular base 1 of a cassette has in the front side wall 2 openings 3 to 5 serving to admit the magnetic heads and pressure rolls (not shown) on the recorder. Openings 6 and 7 are provided in the base 1 near the side wall 2 for admitting the capstan and tape guide pins on the recorder. Pressure pad 8 and magnetic head screening shield 8a are arranged behind opening 3. A magnetic tape 11 is wound on flangeless spools 9 and 10, which are rotatably mounted on the base 1, to form packs 12 and 13. The tape 11 travels between packs 12 and 13 around idler rolls 14 and 15. In conventional cassettes pins 16 and 17 serve as additional guide means. Pivots 18 and 19 for levers 20 and 21 are let into the base 1 and the top wall (not shown) of the cassette, said pivots being arranged inside the loop formed by the tape 11 and near the idler rolls 14 and 15. For the purposes of the invention the outermost winding is defined as the last winding on the pack plus that portion of tape which extends from the point at which it joins the pack to an imaginary line tangential to the pack, at full pack diameter, and parallel to line 23. The length of tape on the other side of the imaginary line is referred to herein as the loop. Friction between the tape and the guide means is reduced to such an extent by the use of levers 20 and 21 that the idler rolls 14 and 15 can be replaced by integral tape guide pins. Friction can be further reduced by making these pins of materials over which the tape slides well. Levers 20 and 21 are slightly bowed and are arranged symmetrically with respect to the transverse central axis of the base 1. When the tape is stationary, as shown in FIG. 1, the free ends of levers 20 and 21 contact the outsides of the packs 12 and 13 at a point near the line 23 passing through the center of the hubs, the free ends of levers 20 and 21 being interposed between the outermost windings and the packs. The free ends themselves have guide surfaces and wedge-shaped guide flanges 24 and 25, as can be seen from FIG. 2, the smallest distance between the flanges corresponding to the width of the tape. The free ends of the levers 20 and 21 between the guide flanges 24 and 25 are tapered on the guide-surface sides to prevent the tape from being damaged and to facilitate the passage of the tape onto the pack. Lever 20a shown in FIG. 2A, which constitutes a preferred embodiment, is similar in design to lever 20, the only differences being that the guide flanges 24a and 25a are much narrower and are approximately rectangular in cross section and extend from the free ends of the levers to a point beyond the middle thereof. In this embodiment of the invention tape guidance is improved because the tape is guided over a greater length and the guide surface area is increased. FIGS. 3 to 5a show other designs of the levers which are pivotally mounted at other points. In FIG. 3 the lever 26 is pivotally mounted on the shaft used for idler roll 14 (cf. FIG. 1). In this embodiment the idler rolls are dispensed with, the resulting increase in friction between the tape and the sleeve 27 of the lever 26 being overcome by the provision of a coating of suitable lubricant, e.g., graphite, on the said sleeve. Lever 26 is slightly offset so that friction between the tape 11 and the lever is reduced, as compared with lever 20. The offset 28 should be so dimensioned that there is a slight gap between it and the pack at maximum pack diameter.

FIG. 4 shows a lever which is provided with an offset 30 and is pivotally mounted on a guide pin 16 on the base 1. In this case the tape is guided past idler roll 14 around sleeve 31 of the lever 29 via the free end of lever 29 onto the pack 12, i.e., a tape guide pin which is normally present in a conventional cassette is used as pivot for lever 29.

FIGS. 5a and 5b show a lever 32 which is pivotally mounted on pin 16 like lever 29 in FIG. 4. The free end of this lever 32 comprises an upper flange, a lower flange 33 and an offset web 34, a vertical slit being provided between the offset portions. The offset web 34 is parallel to the tape 11 and at a tangent to the pack 12. Tape 11 passes through the slit between the upper and lower flanges which serve as guides for the tape. Web 34 may, if desired, be tapered. The tape path is the same as in FIGS. 1 and 3. The design of the levers and the positioning of the lever pivots, as shown in FIGS. 3 to 5a, have the following advantages: additional friction between the lever and the pack is avoided even at maximum pack diameter; friction between the tape and tape guides is considerably reduced, as compared with conventional cassettes, and consequently less torque is required to drive the reels; and existing pins 16 and the shaft used for idler roll 14 can be used as pivots for levers 26, 29 and 32. In the embodiments shown in FIGS. 3 to 5a the levers are the only parts which are additionally required and which ensure optimal tape guidance.

FIG. 6 shows the tape guide elements in the form of sliding members 35 and 36 which are slidably located in grooves 39 and 40 in the base 1 and top wall of the cassette situated in the lower corner sectors formed by lines 37 and 38 and line 23 radially to the packs 12 and 13. FIG. 7 is a perspective sectional view of the sliding member 35 shown in FIG. 6. When viewed from the side, sliding member 35 has an approximately C profile. Flanges 43 and 44 which are wedge-shaped serve as guide means for the tape 11 and at the same time position the sliding members 35 and 36 in grooves 39 and 40. Web 45 is tapered like the free ends of levers 20, 21, 20a, 26, 29 and 32 to facilitate the passage of the tape 11 onto the pack. In the design of sliding member 46 shown in FIG. 8 the purpose of web 47 is to prevent the tape 11 from jumping out from between flanges 43 and 44. Straight grooves 39 and 40 which are arranged radially to packs 12 and 13 may be replaced for example by suitably curved grooves, it being essential that the sliding members in their position near the packs are located in the lower corner sectors formed by lines 37 and 38 and line 23. Good winding and unwinding of the tape is thus ensured at all pack diameters.

The free ends of the levers can also be guided in grooves in the base and top wall of the cassette in the same manner as the sliding members of FIGS. 7 and 8. If desired, recesses may be provided in the base and top wall of the cassette. FIGS. 9 and 10 show another lever design, a variant of the lever 20a shown in FIG. 2A. Lever 48 is provided at its free end with an integral offset pin 49 so that a slot 50 which is open at the bottom and through which the tape passes is formed between the free end of the lever 48 and the pin 49. The width of slot 50 is less than that of the magnetic tape to ensure that the magnetic tape can only move away from the guide surface of the lever by less than the width of the tape during acceleration, fast braking of the spools and sudden changes in the direction of tape motion. Moreover, this design prevents the outermost winding from slipping from the pack.

A short explanation of how the above-described tape guide elements function is given below:

By arranging at least part of the tape guide elements 20, 21, 20a, 26, 29, 32, 35 and 36 between the packs and the outermost windings, interaction between the pack, the tape guide element and the winding or unwinding of the outermost tape winding is utilized to guide the tape. When the tape is in motion in the cassette or on a studio tape recorder using flangeless spools, i.e., during recording, reproduction and rewinding, the tape guide element is drawn toward the pack by the tape or urged outwardly by the pack being formed. The momentary position of the guide elements — whether they are in direct contact with the packs or in spaced relationship thereto — is dependent on the tensile force applied to the tape at any one time, the friction existing at any one time between the guide elements and the cassette housing and the force applied at any one time to the guide element by the pack as it increases in size. Since the tape guide element is always located between the outermost winding of the pack and the pack itself, the position of the tape guide element being determined in each case by the direction of rotation and size of the pack, the tape constantly bears against the tape guide element. Consequently, whenever the packs rotate, the tape guide elements of the invention ensure optimal guidance of the winding and unwinding tape, i.e., each winding is freshly oriented on the pack during winding of the tape and each portion of the tape is freshly aligned with respect to the front wall 2 of the cassette during unwinding of the tape, which results in completely troublefree operation.

We claim:

1. In a magnetic tape assembly, the combination comprising:

a pair of tape-supporting flangeless spools rotatable to unwind tape off a pack on one spool and wind tape onto a pack on the other spool, said tape passing between the packs around guide means in the form of a loop, and b. at least one guide element movable substantially radially to one of said spools and in the plane of rotation of said spools, at least part of said guide element being arranged between the pack and the outermost winding generally at a tangent to said pack, having a guide face which is substantially flat longitudinally of said outermost winding, thereby providing continuous surface contact over a substantial length of said face between said face and the inside of said outermost winding when said tape is in motion, having adjacent that end of the guide face at which said outermost winding merges with said pack, a margin which is at least as close to the pack as said face so that said outermost winding is guided smoothly and virtually tangentially to said pack at said margin, and having guide flanges extending outwardly above and below said outermost winding.

2. The combination of claim 1 wherein said guide element is slidable in the plane of rotation of the spools.

3. The combination of claim 2 wherein said slidably mounted member has a C profile when viewed from the side.

4. The combination of claim 1 wherein said guide element is a lever pivotable in the plane of rotation of the spools.

5. The combination of claim 4 wherein said guide flanges are provided at the free end of said lever, and wherein said end margin is provided on said free end of the lever at a point near the line passing through the center of the spools.

6. The combination of claim 4 wherein said assembly includes idler rolls and wherein said lever is pivotally mounted on a pin inside the loop of tape near one of said idler rolls.

7. The combination of claim 4 wherein said assembly includes pins disposed inside said loop and wherein said lever is pivotally mounted on one of said pins, the end of said lever at which it is pivotally mounted being used as a guide means for said loop of tape.

8. The combination of claim 4, wherein said lever has a base portion and a free end portion; wherein there are provided means for pivotally mounting said base portion outside said loop; wherein said free end portion of the lever, which has said flat guide face, said margin and said flanges, is offset from said base portion; and wherein at the point of offset a slot is provided in said lever, through which said outermost winding passes.

9. The combination of claim 4 wherein the free end of said lever has an offset pin disposed outwardly of said tape and spaced from said margin to provide a slot for accommodating said outermost winding, the width of said slot being less than that of said tape.

10. The combination of claim 1 wherein said guide element or at least said part thereof is of generally arcuate shape and wherein the thickness of said arcuate element or part tapers toward said margin.

11. In a magnetic tape cassette, the combination comprising:

a. a pair of tape-supporting flangeless spools rotatable to unwind tape off a pack on one spool and wind tape onto a pack on the other spool, said tape passing between the packs in the form of a loop in the course of which said tape comes into contact with magnetic transducer means penetrating through openings in the cassette, and b. a first guide lever provided for the pack on the winding spool and a second guide lever provided for the pack on the unwinding spool, each of said guide levers being mounted for pivotal movement substantially radially to the corresponding one of said spools and in the plane of rotation of said spools, at least part of each of said guide levers being arranged between the corresponding pack and its outermost winding generally at a tangent to the pack, having a guide face which is substantially flat longitudinally of said outermost winding, thereby providing continuous surface contact over a substantial length of said face between said face and the inside of said outermost winding when the tape is in motion, having adjacent that end of the guide face at which said outermost winding merges with said pack, a margin which is at least as close to the pack as said face, and having guide flanges extending above and below, respectively, said outermost winding, said guide face, margin and guide flanges being of a configuration such as to stiffen said tape before initial contact with the pack of said winding spool and after ultimate contact with the pack on said unwinding spool, and to freshly orient each of the unwound windings in an aligned position relative to said transducer means and each of the windings to be wound in its proper position on the pack regardless of how the side surfaces of the pack happen to be shaped.

*12. In a magnetic tape cassette, the combination comprising:*

*a. a pair of tape-supporting flangeless spools rotatable to unwind tape off a pack on one spool and wind tape onto a pack on the other spool, said tape passing between the packs in the form of a loop in the course of which said tape comes into contact with magnetic transducer means penetrating through openings in the cassette, and*

*b. a first guide element provided for the pack on the winding spool and a second guide element provided for the pack on the unwinding spool, each of said guide elements being mounted for displacement towards or away from the corresponding one of said spools and in the plane of rotation of said spools, and at least part of each of said guide elements being arranged between the corresponding pack and its outermost winding generally at a tangent to the pack, having a tape support portion of an effective length such as to provide, when the tape is in motion, guidance for said outermost winding, on the inside thereof, over a substantially flat longitudinal path regardless of the diameter of the corresponding pack, and having guide flanges extending above and below, respectively, said outermost winding, said tape support portion and guide flanges being of a configuration such as to stiffen said tape before initial contact with the pack on said winding spool and after ultimate contact with the pack on said unwinding spool, and to freshly orient each of the unwound windings in an aligned position relative to said transducer means and each of the windings to be wound in its proper position on the pack.*

*13. In a magnetic tape recorder, the combination as claimed in claim 12, wherein each of said guide elements is mounted for bodily movement along a curved path such that, as said element is displaced in response to the unwinding or winding action of the tape, the corresponding tape support portion remains oriented in a plane substantially tangential to said pack.*

* * * * *

UNITED STATES PATENT AND TRADEMARK OFFICE

CERTIFICATE OF CORRECTION

PATENT NO. : Re. 28,863

DATED : Reissued June 15, 1976

INVENTOR(S) : Norbert Schaeffer et al

It is certified that error appears in the above-identified patent and that said Letters Patent are hereby corrected as shown below:

In the Heading, insert -- Foreign Application Priority Data March 29, 1971 Germany P 21 15 124.6 --

Signed and Sealed this

Twenty-sixth Day of October 1976

[SEAL]

*Attest:*

RUTH C. MASON
*Attesting Officer*

C. MARSHALL DANN
*Commissioner of Patents and Trademarks*